Patented July 16, 1940

2,208,296

UNITED STATES PATENT OFFICE 2,208,296

PROCESS OF OBTAINING VINYL METHYL KETONE

Heinrich Lange and Otto Horn, Frankfort-on-the-Main-Hochst, Germany, assignors to I. G. Farbenindustrie Aktiengesellschaft, Frankfort-on-the-Main, Germany No Drawing. Application July 10, 1937, Serial No. 153,000. In Germany July 24, 1936

3 Claims. (Cl. 202—46)

The present invention relates to a process of obtaining vinyl methyl ketone.

During the preparation of vinyl methyl ketone by the addition of water to monovinyl acetylene a part of the ketone is obtained as an aqueous solution. From this solution the vinyl methyl ketone has been recovered by salting it out (while cooling) with potassium carbonate; or the vinyl methyl ketone has been distilled from the solution either directly, if necessary after the solution had been neutralized with caustic alkali, or under reduced pressure; or the ketone was extracted by means of a solvent or the solution was salted out with neutral or acid salts. As the vinyl methyl ketone is very sensitive to alkali and to heat, much of it is lost by an undesired polymerization; moreover, the operations necessary are complicated and uneconomical.

Now we have found that the vinyl methyl ketone may be recovered more rapidly and more economically without the application of potassium carbonate by distilling with steam the dilute aqueous solution of the ketone. At the beginning of the operation nearly pure vinyl methyl ketone distils (with only a small content of water) which, after having been dried, is at once subjected to a further distillation so as to obtain the pure product, whereas the aqueous solution which next distils in the operation and has been enriched in ketone to a large extent is returned to the steam distillation apparatus. By this operation it is possible to avoid the uneconomical use of potassium carbonate and, while saving time, to improve the yield. Furthermore the quantity of liquid to be treated has substantially been diminished by the enrichment. As at atmospheric pressure the vinyl methyl ketone cannot withstand distillation it is surprising that it can profitably be distilled in the presence of steam. The vinyl methyl ketone may even be distilled in superheated steam.

Furthermore we have found that the same process can be used in working-up the spent contact, namely the waste liquor produced by the reaction between water and monovinylacetylene in the presence of an acid and a mercury salt.

The vinyl methyl ketone may be obtained in a better yield and in a more rapid and economical manner if the liquor in which the reaction has occurred and containing the contact is subjected to a steam distillation, if desired with the addition of a stabilizing agent. At the beginning of the operation pure vinyl ketone with a small content of water distils which, after having been dried, is at once subjected to a further distillation so as to obtain the pure product; the aqueous solution enriched in ketone which subsequently distils is returned to the steam distillation apparatus. It is surprising that the vinyl methyl ketone which is known to be very sensitive to heat (it polymerizes at its boiling point of 86° C.; cf. German Patent No. 594,083, page 4, lines 21 to 24) withstands steam distillation at a temperature of 100° C., and more without polymerizing. Superheated steam may also be used.

The following examples serve to illustrate the invention, but they are not intended to limit it thereto:

1. 5 kilograms of an aqueous solution of vinyl methyl ketone obtained during the preparation of the ketone by the addition of water to monovinyl acetylene are distilled with steam. At the beginning of the operation in the course of 30 minutes, 550 grams of vinyl methyl ketone distil which, after having been dried with calcium chloride, are distilled to obtain the pure product. The subsequently distilling enriched aqueous solution of vinyl methyl ketone (1 kilogram) is subjected to a further distillation with steam and yields 100 grams of vinyl methyl ketone.

2. 10 kilograms of a mercury contact liquid containing the vinyl methyl ketone made by the addition of water to monovinyl acetylene, are distilled with steam. At the beginning of the operation, in the course of 20 to 30 minutes, 850 grams of vinyl methyl ketone distil which, after having been dried, are distilled to obtain the pure product. The subsequently distilling enriched aqueous solution of vinyl methyl ketone (about 1.5 kilograms) is further distilled with steam and yields 150 grams of vinyl methyl ketone.

We claim:

1. Process of isolating vinyl methyl ketone from an aqueous solution thereof which comprises subjecting said solution to distillation treatment involving passing steam into and through said solution at substantially atmospheric pressure, whereby material polymerization of the vinyl methyl ketone is inhibited, condensing the distillate, and dehydrating the condensate by treating the same with a dehydrating agent.

2. Process as defined in claim 1, in which the steam is superheated steam at a temperature not materially in excess of 120° C.

3. Process as defined in claim 1, in which the first portions of distillate are condensed and dried as defined, and in which the subsequently distilled portions, so enriched with vinyl methyl ketone, are subjected to a redistillation with steam for the isolation of further amounts of vinyl methyl ketone.

HEINRICH LANGE.
OTTO HORN.